United States Patent [19]
Leadbeater

[11] Patent Number: 6,129,940
[45] Date of Patent: Oct. 10, 2000

[54] METHOD AND APPARATUS FOR MAKING FOOD ARTICLES

[75] Inventor: John Michael Leadbeater, York, United Kingdom

[73] Assignee: Nestec S.A., Vevey, Switzerland

[21] Appl. No.: 09/203,349

[22] Filed: Dec. 2, 1998

[30] Foreign Application Priority Data

Dec. 16, 1997 [GB] United Kingdom ............... 9726562

[51] Int. Cl.[7] ............................. A23P 1/00; B29C 35/00
[52] U.S. Cl. ..................... 426/515; 425/237; 425/408; 426/512
[58] Field of Search .................. 426/515, 512, 426/285; 425/237, 363, 375, 408

[56] References Cited

U.S. PATENT DOCUMENTS

| | | | |
|---|---|---|---|
| 2,497,212 | 2/1950 | Donofrio | 425/237 |
| 5,358,727 | 10/1994 | Yates et al. | 426/512 |
| 5,382,149 | 1/1995 | Yates et al. | 425/237 |

FOREIGN PATENT DOCUMENTS

| | | |
|---|---|---|
| 1 223 677 | 8/1966 | Germany . |
| 0532694A | 1/1941 | United Kingdom . |
| 641682 | 8/1950 | United Kingdom . |
| 1178059A | 3/1970 | United Kingdom . |
| WO91/08674 | 6/1971 | WIPO . |
| WO 98/38871 | 9/1998 | WIPO . |

OTHER PUBLICATIONS

Patent Abstract of Japan, vol. 011, No. 297 (C–488), Sep. 25, 1987 & Japan 62 087056 (Ezaki Glyco KK), Apr. 21, 1987.

*Primary Examiner*—George C. Yeung
*Attorney, Agent, or Firm*—Pennie & Edmonds LLP

[57] ABSTRACT

The invention relates to a method of making food articles such as chocolate articles. The method comprises providing first and second surfaces with cavities that are capable of alignment, depositing a first food in the form of a solidifiable liquid into the cavities of the first surface, depositing a second food in the form of a solidifiable liquid into the cavities of the second surface, aligning the cavities by moving the first and second surfaces toward each other, thus contacting the first food in the first cavities with the second food in the second cavities, and separating the aligned cavities to obtain food articles, wherein the first food comprises a first part of each food article and is joined to the second food which comprises a second part of each food article. The invention also relates to an apparatus for this purpose.

18 Claims, 2 Drawing Sheets

METHOD AND APPARATUS FOR MAKING FOOD ARTICLES

TECHNICAL FIELD

The present invention relates to manufacturing of food articles, in particular to the manufacturing of confection articles such as chocolate articles.

BACKGROUND ART

Confection articles such as lentils, solid balls and eggs, coffee beans and confection almonds can be produced by using a pair of counter rotating rollers having engravings or cavities on their cylindrical surface. The shape of the article to be produced is engraved between the two rollers.

The two rollers are positioned parallel to each other and substantially abutting one another. Liquid tempered chocolate or other fat-based mass is dosed into the nip of rollers. The nip is the point where the surfaces of the rollers are closest to each other. The liquid tempered chocolate is then cooled and shaped between the rollers. The rollers, usually produced from stainless steel, are cooled to a low temperature by means of a cooling medium which flows through them. When passing through the roller nip the liquid chocolate takes the shape of the roller surfaces and a continuous band of shaped chocolate articles joined by a thin web of chocolate is formed. The band is further cooled, the shaped chocolate articles are separated, and the web material is removed. Subsequently, the shaped chocolate articles can be polished, panned, for example, with a sugar coating or wrapped. An example of the above-described rollers is "Eriksen Rollers" sold by Aasted, Denmark.

The rotation speed of the rollers is limited by the solidification rate of the chocolate between the two rollers. Thus, the capacity of the rollers depends on the cooling capacity of the rollers in the nip. If the chocolate is not sufficiently solidified, the chocolate will tend to stick to the surface of the roller and there is a risk that the band of shaped articles joined by the thin web will tear. In addition, if the centers of the chocolate articles are not sufficiently solidified, the article may be damaged or deformed by contact with a takeoff conveyor or collection hopper. Thus improvements in this process would be desirable.

SUMMARY OF THE INVENTION

The present invention now provides a method which increases the capacity of the rollers and improves the shape of the food articles. The method includes the steps of providing first and second surfaces with cavities that are capable of alignment, depositing a first food in the form of a solidifiable liquid onto the first surface and into the cavities of the first surface, separately depositing a second food in the form of a solidifiable liquid onto the second surface and into the cavities of the second surface, allowing the first and second foods to at least partially solidify in the cavities, aligning the cavities by moving the first and second surfaces toward each other, thus contacting the first food in the first cavities with the second food in the second cavities, and separating the aligned cavities to obtain food articles, wherein the first food comprises a first part of each food article and is joined to the second food which comprises a second part of each food article. Preferably, the first and second surfaces are of cylindrical form and are rotated in opposite directions to align the cavities. Preferably, the first and second solidifiable liquid foods are dosed into the cavities of the first and second rollers at a position of about 120 to 60 degrees of rotation upstream of the nip of the rollers.

According to the method of the present invention the first and second foods may be the same material but separately introduced into the first and second cavities. The first and second foods may also be different. Preferably at least one of the foods is completely solidified before it contacts the other. Preferably, the surfaces are chilled to assist in the solidification and joining of the first and second foods.

An inclusion may also be placed into at least one of the first or second cavities before the first and second parts of the food article are joined to produce a food article having an inclusion.

It is also possible to prepare hollow food articles in accordance with the present invention by providing at least one of the first and second foods only on the cavity surface. In addition, by providing an inclusion in the cavity filled food articles can be prepared.

In a variant of the method the first and second food articles are solidified and additional food in a solidifiable liquid form is deposited between the first and second parts to assist in forming the articles.

Another aspect of the invention relates to an apparatus for making food articles. The apparatus comprising a pair of rollers arranged parallel to each other with each having an outer cylindrical surface that includes cavities, a first depositor for depositing a first solidifiable liquid food onto the first surface and into the cavities of the first roller to provide a first part of a food article, a second depositor for depositing a second solidifiable liquid food onto the second surface and into the cavities of the second roller to provide a second part of a food article, and means for counter rotating the rollers so as to move the outer surfaces of each roller toward each other to align the cavities and join the first and second food article parts into a single food article. Preferably, the first and second solidifiable liquid foods are dosed into the cavities of the first and second rollers at a position of about 120 to 60 degrees of rotation upstream of the nip of the rollers. Preferably, the apparatus further comprises means for chilling the rollers to assist in cooling the solidifiable liquid foods.

The apparatus of the present invention may be adapted to make hollow or two-component food articles by arranging molding means to descend into the cavities on the surface of at least one of the rollers after the depositor has filled the cavity with solidifiable food and before the cavities encounter the nip to form hollow shells of solidifiable food in the cavities. Preferably, the molding means comprises an additional roller having an outer cylindrical surface that includes projections.

According to the present invention the first and second liquifiable foods may be the same, and the depositors part of a depositing system which comprises two manifolds for depositing the liquifiable food into the cavities on the rollers, each manifold having a central hollow chamber, a vertical slot along its full length which exits onto the top surface of the rollers, and connected to a supply pipeline of the solidifiable liquid food, and means for pumping the solidifiable liquid food simultaneously into the chamber of each manifold.

BRIEF DESCRIPTION OF THE DRAWINGS

The invention will now be described in further detail, by way of example only, with reference to the accompanying drawings in which.

DETAILED DESCRIPTION OF THE PREFERRED EMBODIMENTS

Figure 1:
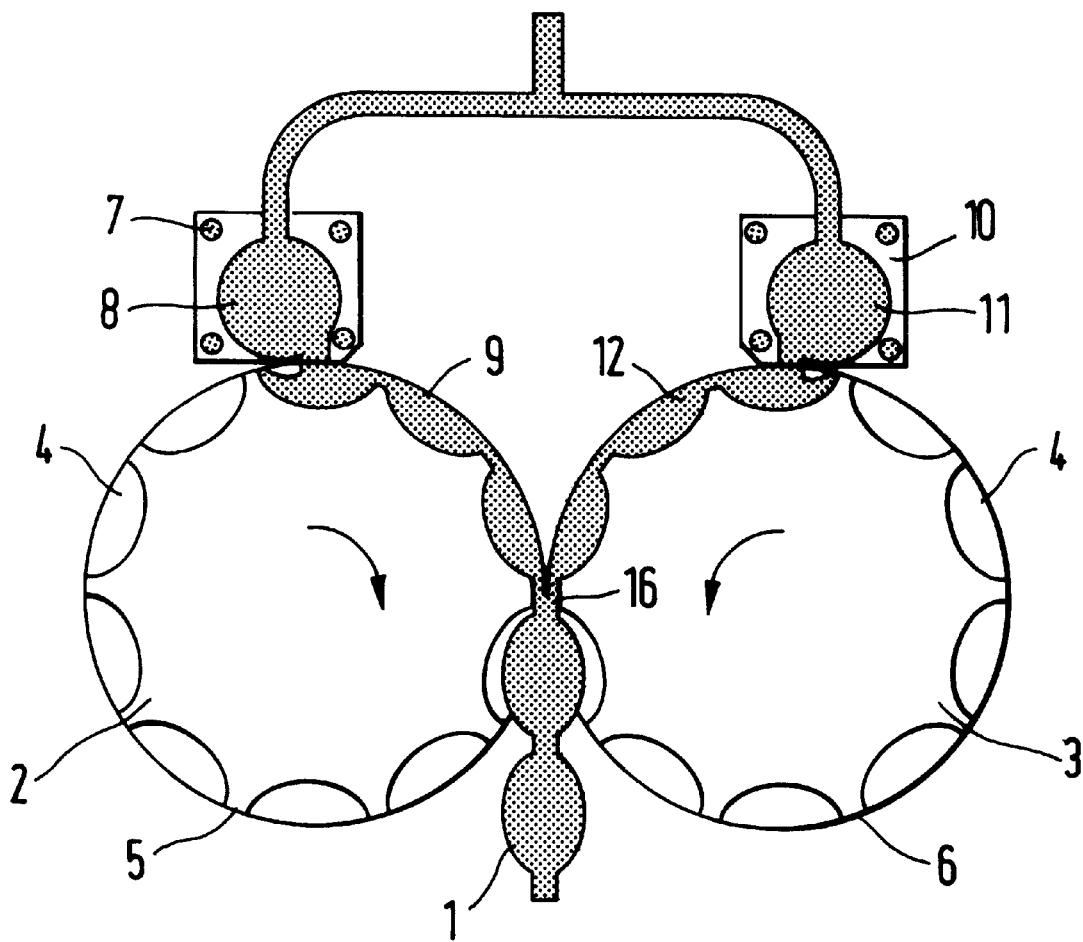
FIG. 1 is a schematic drawing of an apparatus for carrying out the method of the present invention.

The solidifiable liquid food is preferably a food product which solidifies, at least partly, on the outside surface when the food comes in contact with the surface of the roller. If desired, the rollers may be chilled to assist in more rapidly solidifying the liquid food. The method is particularly suitable for liquid food products which solidify at a temperature of from about 20 to about 35° C., such as chocolate and fat-based confection.

It has surprisingly been found that food articles may be produced by first molding separate parts of the food article on separate rollers which are arranged parallel to each other and substantially abutting each other and afterwards joining the separate part on one roller with the separate part on the other roller by counter rotating the rollers. The counter rotation of the rollers brings the separate parts into contact and joins them by pressing the separate parts against each other as they enter the nip. In this way, food articles are produced by uniting two separate halves of the food article. It has been found that the joined articles are substantially homogenous pieces.

To carry out the present method, liquid food is dosed onto the rollers before the nip. In this way the rotation speed of the rollers is not limited by the cooling capacity of the rollers in the nip. Solidification of the liquid food occurs as the roller surfaces move from the dosing station to the nip. Thus the rollers may be rotated at a much higher speed, with examples illustrating this increased capacity being given below. The solidifiable liquid food is preferably dosed into the cavities on the cylindrical surface of the rollers at a position from about 120 to about 60 degrees of rotation before the nip, most preferably from about 100 to about 80 degrees of rotation before the nip. Preferably the rollers are chilled to maintain a cavity temperature in the range of about 0 to about 20° C.

For certain types of food material it is possible to allow one part of the food material to substantially solidify before it is brought into contact with its counterpart on the opposite roller. The separate parts of the food article are then joined as a result of the pressure which is generated when the roller surfaces are moved toward one another in the nip. For other types of food products, it is desirable that the food material be only partly solidified to allow for better adherence between the separate parts of the food article.

In manufacturing confections such as chocolates or fat-based confections, it is preferable that the liquid confection mass that is dosed onto the rollers be only partly solidified before the parts of the food article are joined. Alternatively, the parts of the food article may be solidified before they are joined and a small portion of additional chocolate or fat-based confection can be dosed into the nip to act as an adhesive and to form the web in which the article sits for further processing.

Furthermore, it has surprisingly been found that it is possible to produce hollow chocolate articles in accordance with the present method. A particularly suitable embodiment of the method for this is described below.

In addition, it has been found that chocolate centers with inclusions may be produced by the method. This is accomplished by depositing inclusions such as, but not limited to, pieces of nuts, fruits, and crisps into a chocolate part just before the chocolate parts are joined. The inclusions will thus be substantially embedded within the chocolate shells in the roller nip.

Furthermore, the method is useful for manufacturing food articles which are a combination of different liquid foods, for example chocolate articles or fat-based confections that are a combination of different types of chocolate or fat-based confections. Examples of such articles are chocolates having dark and white parts, or chocolates having milk chocolate and dark chocolate parts.

The method is particularly suitable for the production of confection articles such as a chocolate or fat-based confections. Fat-based confections contain an amount of fat, which functions primarily to determine the texture, taste and eating quality of the confection. However, it is understood that the method is not limited solely to applications in this product area. The method may be used to shape other kinds of food articles which are made from liquid food materials that solidify at ambient temperature. Thus, the discussion concerning manufacturing confection products is equally applicable to other types of food products, the solidification and shaping of which is similar to that of confection products. Examples of other products which may be manufactured in accordance with the method include, but are not limited to, gums, jellies, pastilles, nut pralines, high-boiled sugar sweets, butter balls, and the like. Savory products such as sauce pellets or cheese may also be manufactured by the method of the present invention.

The appropriate temperature of the liquid product and the roller temperature depends on the product composition. For example, the solidification temperature may be 120° C. or higher for sugar confections. For tempered chocolate a suitable solidification temperature is from about 25 to about 33° C. Thus, for tempered chocolate the preferred temperature of the liquid product is from about 28° to about 35° C. The appropriate temperature depends on the ingredients in the chocolate blend used.

In accordance with the invention, it has been found that the capacity of the rollers can be increased by as much as 100% or more compared to the conventional systems discussed above.

Another aspect of the invention relates to an apparatus for making food articles. The apparatus comprising a pair of rollers arranged parallel to each other, the rollers having cavities defined on their outer cylindrical surface, a first depositor for depositing solidifiable liquid food onto the first surface and into the cavities on the first roller to provide a first separate part of a food article, a second depositor for depositing the liquid food onto the second surface and into the cavities on the second roller to provide a second separate part of a food article, and means for counter rotating the rollers so as to move the surface of each roller toward each other to join the first and second separate parts into a single food article.

FIG. 1 shows an apparatus for performing the method of making food articles 1 according to the invention. The apparatus comprises a pair of rollers 2 and 3 arranged parallel to each other and having cavities 4 defined on their outer cylindrical surfaces 5 and 6. A first depositor 7 is provided for depositing solidifiable liquid food 8 into the cavities 4 on the first roller 2 to provide a first separate part of a food article 9. The apparatus also has a second depositor 10 for depositing the liquid food 11 into the cavities 4 on the second roller 3 to provide a second separate part of a food article 12. A conventional motor is arranged to counter rotate rollers 2 and 3 so as to move surfaces 5 and 6 toward each other to join the separate food article parts 9 and 12 into a single food article 1 at the nip 16.

The first and second depositors 7 and 10 may be part of a depositing system. In the depositing system solidifiable liquid food is deposited into the cavities on the rollers by means of two manifolds, one for each roller. The manifolds are mounted in close proximity to the roller surfaces, preferably from about 0.2 to about 0.4 mm from the roller surfaces. Preferably the manifold outlets are positioned above the vertical center line of the axis of the rotation of each roller. Each manifold has a central hollow chamber, a vertical slot along its full length, and is connected to a product supply pipeline by a stainless steel pipe. Solidifiable liquid food is simultaneously pumped into the chamber of each manifold and exits through the vertical slot onto the top surface of the rollers filling the cavities of the roller surface and leaving a thin coating of solidifiable liquid food on the roller surfaces. The thickness of the coating on the roller surface is from about 0.4 to about 0.6 mm, and most preferably is about 0.5 mm.

Preferably the manifolds are drilled lengthwise with small holes through which warm water is circulated. The temperature of the water is adapted to keep the food product liquid. For chocolate and fat-based confections a suitable temperature is about 30° C.

Rollers 2 and 3, which are adapted to revolve in opposite directions, are preferably positioned in close proximity to each other. The preferred clearance between the rollers is approximately 1 mm. For chocolate and fat-based confections the preferred rotation speed of the rollers is typically from about 1 to 2 revolutions per minute. Advantageously, the rollers are cooled with a circulating coolant. For chocolate and fat-based confections the temperature of the circulating coolant is from about 18 to about 22° C., preferably about 20° C.

It is preferred that the separate parts of the food article in the cavities are sufficiently melted so that separate part of the food article 9 sticks to separate part of the food article 12 to form a single homogeneous piece of food article 1 which is attached to adjacent articles by a thin web of food material. This web can later be removed in a conventional way such as by tumbling.

Figure 2:
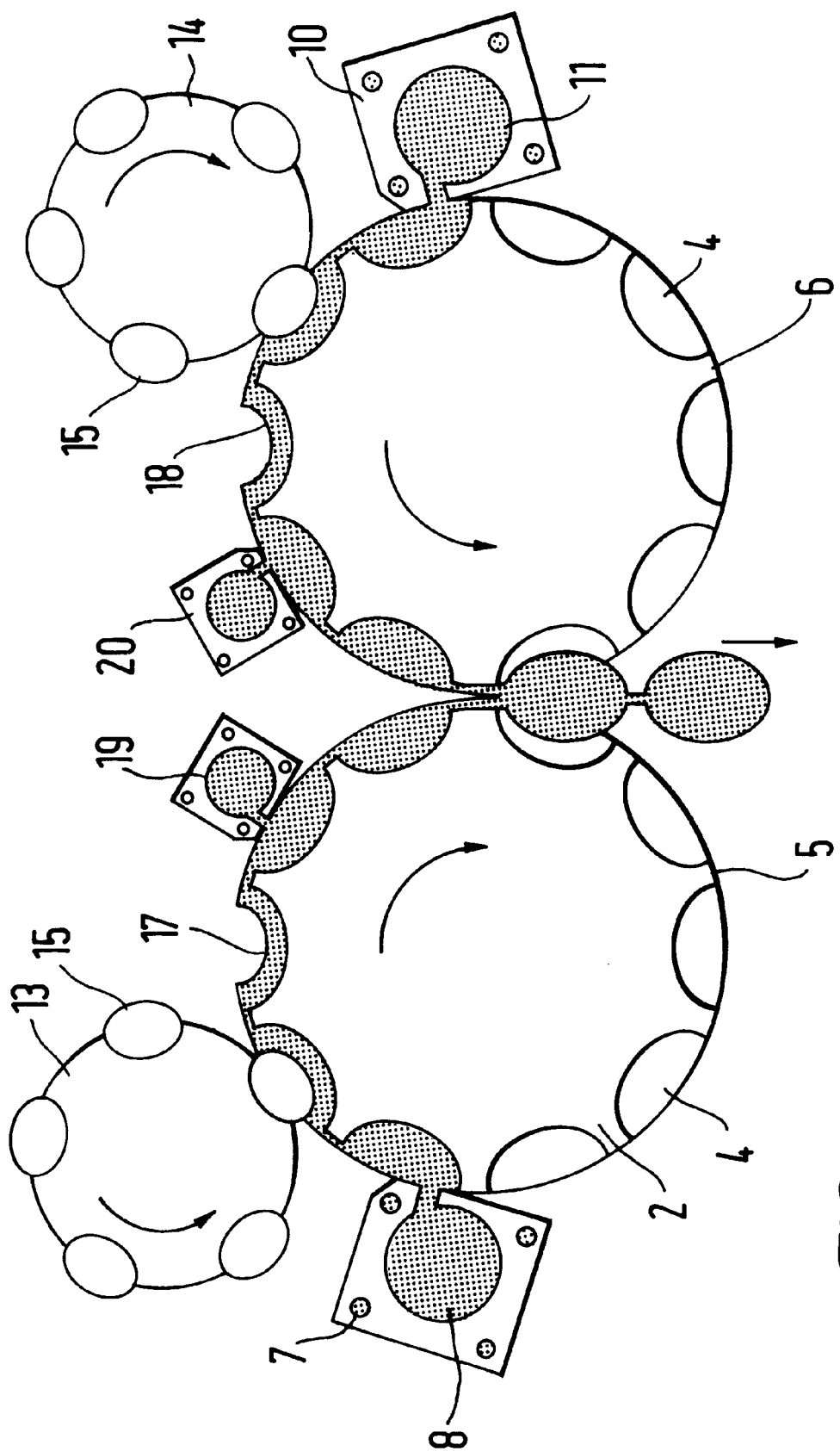
FIG. 2 is a schematic drawing of an apparatus for manufacturing a hollow or two-component articles in accordance with the present invention.

FIG. 2 shows an apparatus according to the present invention which is adapted to make hollow or two-component articles. In this embodiment molding means in the form of a pair of rollers 13 and 14 are arranged parallel with rollers 2 and 3, respectively. Rollers 13 and 14 have projections 15 on their periphery which descend into the cavities 4 on the surface of one or both of rollers 2 and 3 when rollers 13 and 14 are rotated. Rollers 13 and 14 are positioned so that projections 15 will descend into cavities 4 after depositors 8 and 11 have filled cavities 4 with solidifiable food and before cavities 4 encounter the nip 16. The food article parts 17 and 18 thus formed can be joined in the nip 16 to form a hollow food article. If desired a center component may be inserted into the parts of the food article by means of a second pair of depositors 19 and 20. This allows two-component articles to be made. Similarly, other articles can be made by employing additional rollers and depositors. The process is limited only by the space available for arranging the additional rollers and depositors above rollers 2 and 3.

Another embodiment of the invention is adapted to make food products which are less adhering when partly or fully solidified. This embodiment includes means for depositing additional solidifiable liquid food at the nip of the rollers.

What is claimed is:

1. A method of making food articles solidifiable at ambient temperature which comprises:

providing first and second surfaces with cavities that are capable of alignment;

depositing a first food in the form of a solidifiable liquid onto the first surface and into the cavities of the first surface;

separately depositing a second food in the form of a solidifiable liquid onto the second surface and into the cavities of the second surface;

allowing the first and second foods to at least partially solidify in the cavities;

aligning the cavities by moving the first and second surfaces toward each other, thus contacting the first food in the first cavities with the second food in the second cavities; and separating the aligned cavities to obtain food articles, wherein the first food comprises a first part of each food article and is joined to the second food which comprises a second part of each food article.

2. The method of claim 1, which further comprises configuring the first and second surfaces in cylindrical form and rotating the first and second cylindrical surfaces in opposite directions to align the cavities.

3. The method of claim 1, wherein the first and second solidifiable liquid foods are dosed into the cavities of the first and second rollers at a position of about 120 to 60 degrees of rotation upstream of the nip of the rollers.

4. The method of claim 1, wherein the first and second foods are the same material but are separately introduced into the first and second cavities.

5. The method of claim 1, which further comprises completely solidifying at least one of the foods before it contacts the other.

6. The method of claim 1, which further comprises chilling the surfaces to assist in the solidification and joining of the first and second foods.

7. The method of claim 1, which further comprises placing a food product into at least one of the first or second cavities before the first and second parts of the food article are joined.

8. The method of claim 1, wherein the first and second foods are different.

9. The method of claim 1, which further comprises providing at least one of the first and second foods only on the cavity surface so that hollow food articles can be prepared.

10. The method of claim 9, which further comprises providing a food product in the cavity so that filled food articles can be prepared.

11. The method of claim 1, wherein the first and second food articles are solidified and which further comprises depositing additional food in a solidifiable liquid form between the first and second parts to assist in forming the articles.

12. An apparatus for making food articles solidifiable at ambient temperature comprising:

a pair of rollers arranged parallel to each other with each having an outer cylindrical surface that includes cavities;

a first depositor for depositing a first solidifiable liquid food onto the first surface and into the cavities of the first roller to provide a first part of a food article;

a second depositor for depositing a second solidifiable liquid food onto the second surface and into the cavities of the second roller to provide a second part of a food article;

means for counter rotating the rollers so as to move the outer surfaces of each roller toward each other to align the cavities and join the first and second food article parts into a single food article; and means for chilling the rollers to assist in cooling the solidifiable liquid foods.

13. The apparatus of claim 12, wherein first and second solidifiable liquid foods are dosed into the cavities of the first and second rollers at a position of about 120 to 60 degrees of rotation upstream of the nip of the rollers.

14. An apparatus for making food articles which comprises:
- a pair of rollers arranged parallel to each other with each having an outer cylindrical surface that includes cavities;
- a first depositor for depositing a first solidifiable liquid food onto the first surface and into the cavities of the first roller to provide a first part of a food article;
- a second depositor for depositing a second solidifiable liquid food onto the second surface and into the cavities of the second roller to provide a second part of a food article;
- means for counter rotating the rollers so as to move the outer surfaces of each roller toward each other to align the cavities and join the first and second food article parts into a single food article; and
- molding means arranged to descend into the cavities on the surface of at least one of the rollers after the depositor has filled the cavity with solidifiable food and before the cavities encounter the nip to form hollow shells of solidifiable food in the cavities.

15. The apparatus of claim 14, wherein the molding means comprises an additional roller having an outer cylindrical surface that includes projections.

16. The apparatus of claim 12, wherein the first and second solidifiable liquid foods are the same, and the depositors are part of a depositing system which comprises two manifolds for depositing the solidifiable liquid food into the cavities on the rollers, each manifold having a central hollow chamber, a vertical slot along its full length which exits onto the top surface of the rollers, and connected to a supply pipeline of the solidifiable liquid food, and means for pumping the solidifiable liquid food simultaneously into the chamber of each manifold.

17. A method of making confections solidifiable at ambient temperature which comprises:
- providing first and second surfaces with walled cavities that are capable of alignment;
- depositing a first confectionary material in the form of a solidifiable liquid onto the walls of the cavities of the first surface;
- separately depositing a second confectionary material in the form of a solidifiable liquid onto the walls of the cavities of the second surface;
- cooling the first and second surfaces so as to allow the first and second confectionary materials to at least partially solidify in the cavities while maintaining the first and second confectionary materials in such a state that they will adhere when placed in contact;
- aligning the cavities by moving the first and second surfaces toward each other, thus contacting the first confectionary material in the first cavities with the second confectionary material in the second cavities; and
- separating the aligned cavities to obtain confections, wherein the first confectionary material comprises a first part of each confection and is joined to the second confectionary material which comprises a second part of each confection.

18. An apparatus for making confections solidifiable at ambient temperature comprising:
- a pair of rollers arranged parallel to each other with each having an outer cylindrical surface that includes walled cavities;
- a first depositor for depositing a first solidifiable liquid confectionary material onto the first surface and into the cavities of the first roller to provide a first part of a confection;
- a second depositor for depositing a second solidifiable liquid confectionary material onto the second surface and into the cavities of the second roller to provide a second part of a confection;
- means for cooling the rollers so as to at least partly solidify the first and second confectionary materials in their respective cavities; and
- means for counter rotating the rollers so as to move the outer surfaces of each roller toward each other to align the cavities and join the first and second confectionary material parts into a single confection.

* * * * *